United States Patent [19]

Chen

[11] Patent Number: 5,435,208
[45] Date of Patent: Jul. 25, 1995

[54] BALANCING STRUCTURE OF BRAKE CABLES HOISTING SEAT OF BICYCLE

[76] Inventor: Tse-Min Chen, P.O. Box 1750, Taichung, Taiwan

[21] Appl. No.: 217,651

[22] Filed: Mar. 25, 1994

[51] Int. Cl.$^6$ ............................................. B62L 3/00
[52] U.S. Cl. ................................. 74/570; 74/571 R; 74/500.5
[58] Field of Search ............... 74/500.5, 501.6, 502.2, 74/502.4, 502.6, 570, 571 R, 571 L, 571 M; 188/24.12, 24.19, 24.22, 2 D

[56] References Cited

U.S. PATENT DOCUMENTS

| | | | |
|---|---|---|---|
| 3,072,423 | 1/1963 | Charlton | 74/570 X |
| 4,064,972 | 12/1977 | Ohtani et al. | 188/24.19 |
| 4,850,456 | 7/1989 | Chi | 188/24.19 |
| 5,228,542 | 7/1993 | Mack | 188/24.12 |

*Primary Examiner*—Richard M. Lorence

[57] ABSTRACT

A cable-hoisting apparatus of a bicycle brake comprises a cable-hoisting seat having an axial hole dimensioned to receive therein a bushing which is provided longitudinally with an eccentric through hole serving to enable the cable-hoisting seat to act evenly on the two brake cables so as to cause both brake shoes to arrest simultaneously the rim of a bicycle wheel in motion.

7 Claims, 4 Drawing Sheets

BALANCING STRUCTURE OF BRAKE CABLES HOISTING SEAT OF BICYCLE

BACKGROUND OF THE INVENTION

The present invention relates generally to the braking system of a bicycle, and more particularly to the balancing structure of brake cables hoisting seat of a bicycle.

As shown in FIGS. 3 and 4, the braking system of a conventional bicycle comprises a V-shaped cable-hoisting seat 1 and two linked brake seats 2 and 2'. Located in one wing of the cable-hoisting seat 1 is a fixed end 12 provided with a cable hole 121 in which a steel brake cable 13 is received securely. The brake cable 13 is fastened at one end thereof with the brake seat 2'. Located in another wing of the cable-hoisting seat 1 is an urging end 15 provided therein concentrically with an upper hole 151 and a lower hole 152, which have different diameters. The upper hole 151 is dimensioned to hold a sheathed fitting head 171 of another steel brake cable 16 which is received securely in the lower hole 152 and is fastened at one end thereof with another brake seat 2. As shown in FIG. 3, the steel brake cable 16 has a sheathed end 17 which is fastened at one end thereof with a brake lever. As the brake lever is triggered with hand, the brake seat 2 is caused to turn toward the rim 3 of the wheel 32 of the bicycle. In the meantime, the urging end 15 of the cable-hoisting seat 1 is caused to move downwards, thereby bringing about an upward movement of the fixed end 12 of the cable-hoisting seat 1. As a result, the brake seat 2' is caused to move toward the rim 3 of the wheel 32 of the bicycle. As the brake shoes 21 and 21' of the brake seats 2 and 2' are forced against both side edges 31 of the rim 3 of the wheel 32, the bicycle is brought to a halt.

The conventional bicycle braking system described above is defective in design in that the effect of the braking system is often undermined by the fact that both brake shoes 21 and 21' of the brake seats 2 and 2' often fail to make contact simultaneously with the rim 3 of the wheel 32. In addition, the cable-hoisting seat 1 and the brake seats 2 and 2' are fastened respectively to an upper support tube 42 and a lower support tube 41, which are welded to the fork tube 4. If the job of welding the lower support tube 41 and the upper support tube 42 is done poorly, the operation of the cable-hoisting seat 1 and the brake seats 2 and 2' can be further undermined.

SUMMARY OF THE INVENTION

It is therefore the primary objective of the present invention to provide a cable-hoisting seat of a bicycle braking system with an eccentric bushing fitted into the axial hole of the cable-hoisting seat for enabling the cable-hoisting seat to pull both brake cables in a balancing manner, so as to cause both brake shoes to arrest simultaneously the rim of the wheel of a bicycle.

The foregoing objective of the present invention is attained by a cable-hoisting means which comprises an axial hole dimensioned to receive therein a bushing provided longitudinally with an eccentric through hole for enabling both brake shoes mounted respectively on two brake seats to arrest the rim of a bicycle wheel simultaneously.

DETAILED DESCRIPTION OF THE INVENTION

Figure 1:
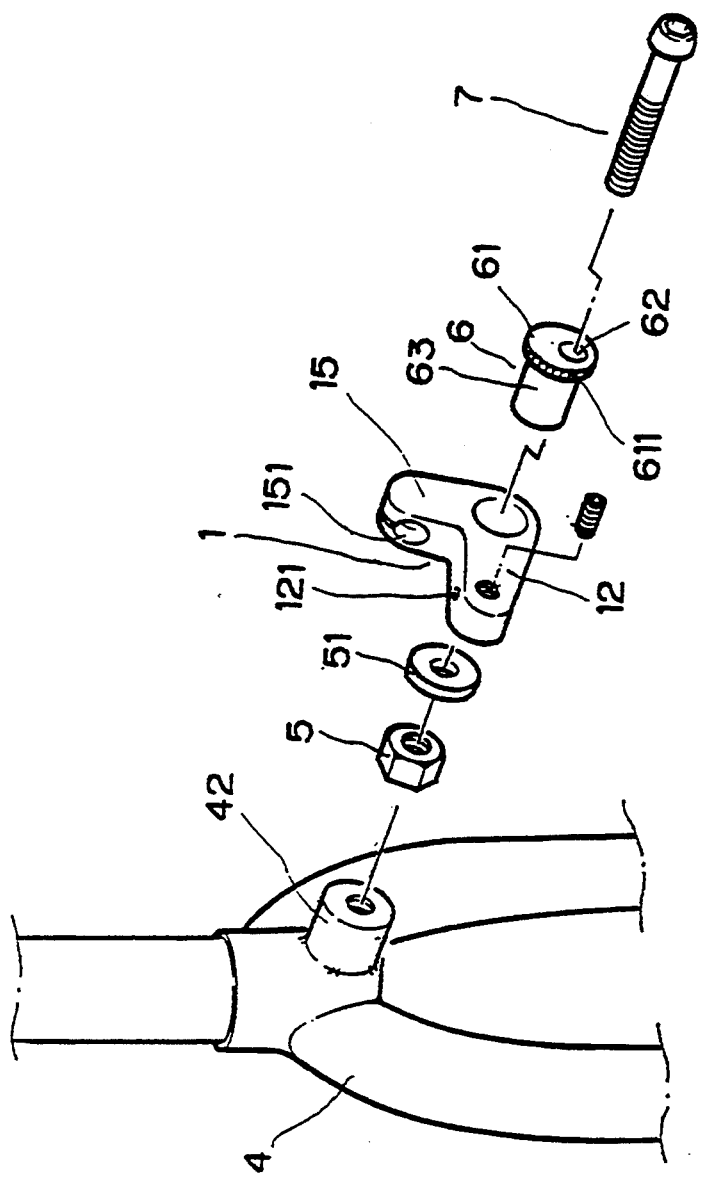
FIG. 1 shows an exploded view of the present invention.
Figure 2A:
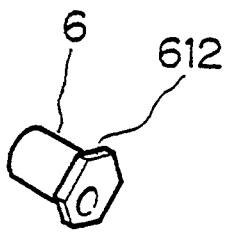
FIG. 2A shows a perspective schematic view of a bushing embodied in the present invention.
Figure 2:
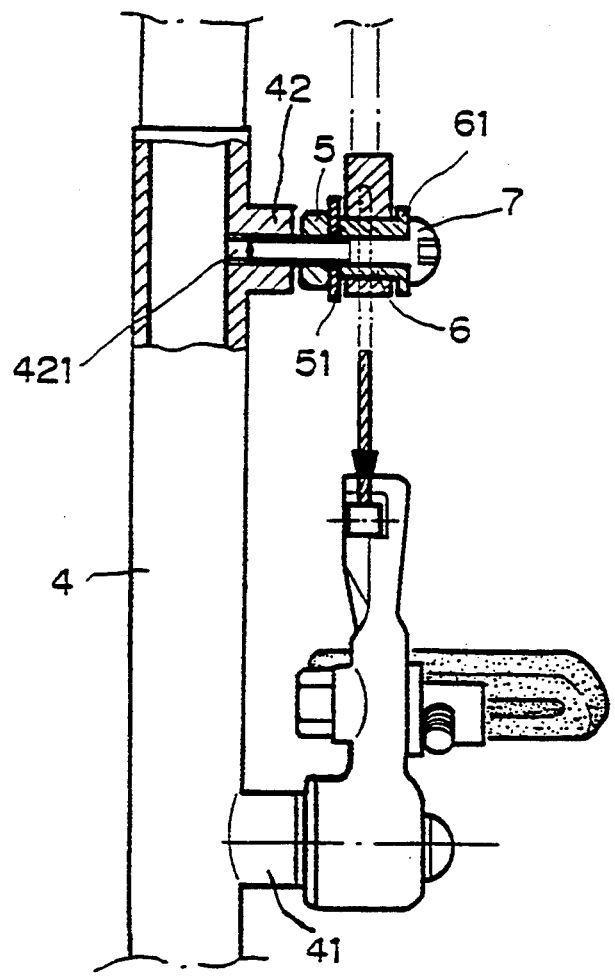
FIG. 2 shows a sectional view of the present invention in combination.
Figure 3:
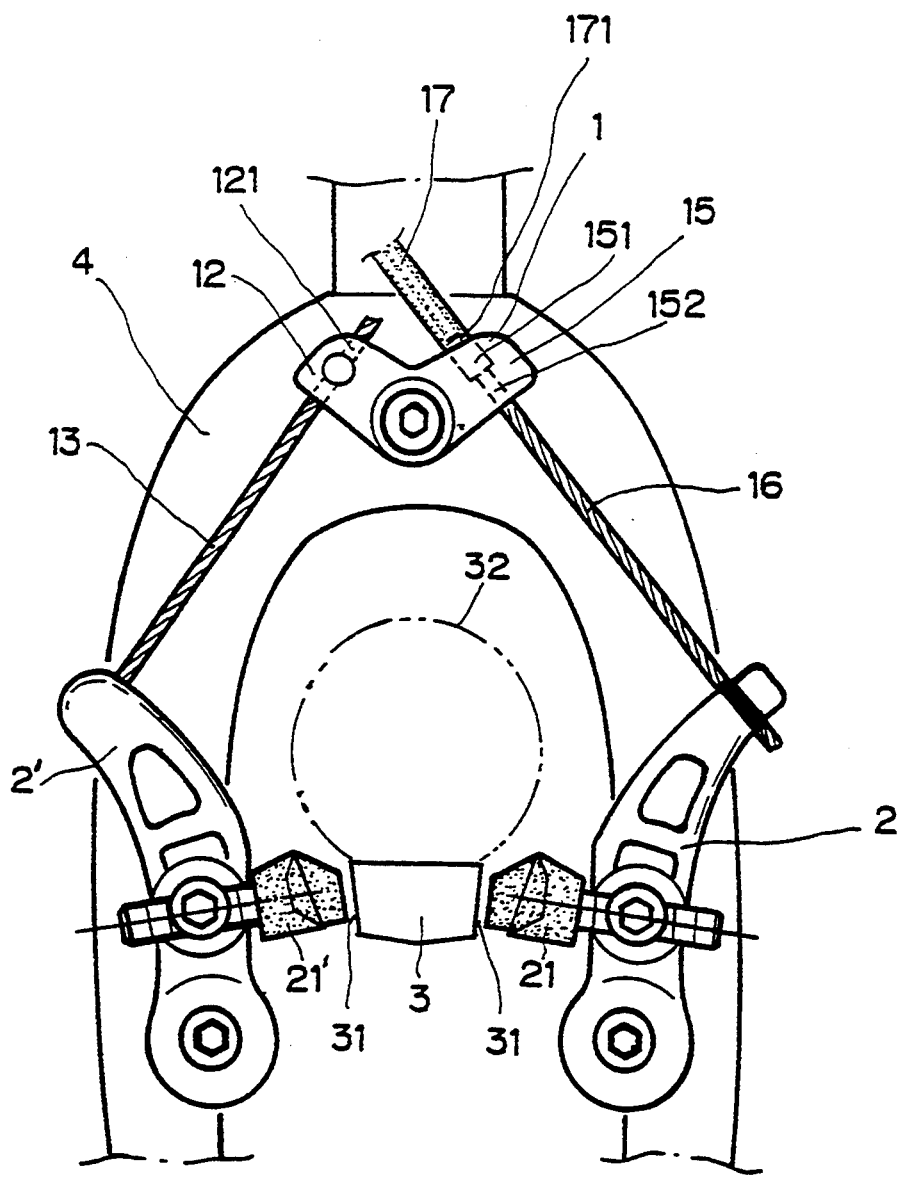
FIG. 3 shows a front schematic view of a bicycle braking system comprising component parts that are commonly used in both the prior art and the present invention.
Figure 4:
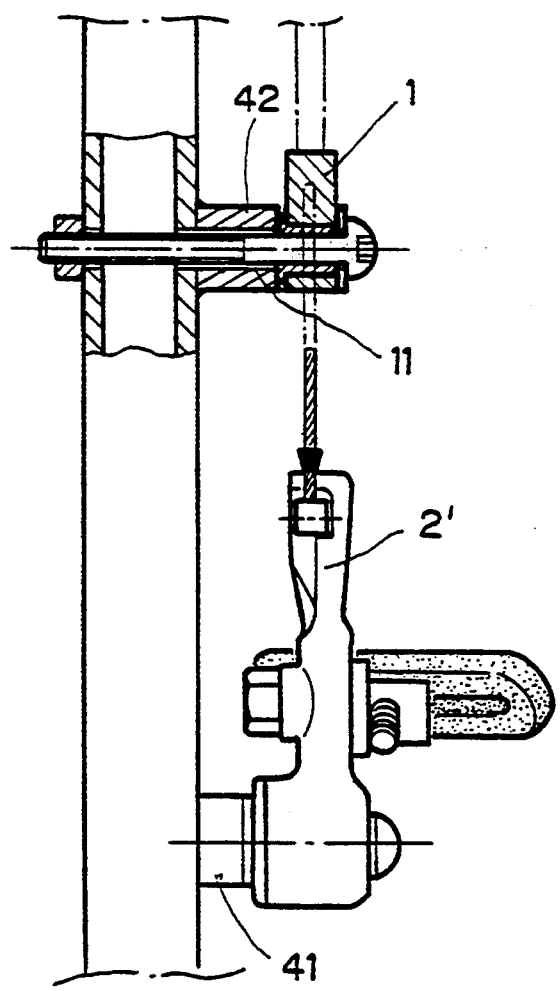
FIG. 4 shows a sectional view of a bicycle braking system of the prior art.

Referring to FIGS. 1, 2 and 3, the present invention is shown to comprise the component parts which are described explicitly hereinafter.

A fork tube 4 is provided with two symmetrically disposed lower support rods 41, and with an upper support rod 42 having longitudinally a threaded hole 421.

A cable-hoisting seat 1 of a U-shaped construction is provided with an axial hole 11, a fixed end 12, and an urging end 15. The fixed end 12 is provided with a cable hole 121 for receiving therein a steel brake cable 13 which is fastened at one end thereof with a brake seat 2'. The urging end 15 is provided concentrically with an upper hole 151 and a lower hole 152. The upper hole 151 is dimensioned to hold therein a sheathed fitting head 171 of another brake cable 16 passing through the lower hole 152 to become fastened at one end thereof with another brake seat 2.

A bushing 6 has a head 61 and a body 63. The head 61 is provided with a flange 611 rotatable with finger. The body 63 is provided axially with an eccentric through hole 62. The bushing 6 may be provided with a head 612 of a hexagonal construction, as shown in FIG. 2A.

In combination, the bushing 6 is fitted into the axial hole 11 of the cable-hoisting seat 1 which is then fastened to the upper support rod 42 by a fastening shaft 7 engageable with the eccentric through hole 62 of the bushing 6 and the threaded hole 421 of the upper support rod 42 in conjunction with a nut 5 and a washer 51.

In the process of adjusting the brake system, the fastening shaft 7 is first loosened to allow the bushing 5 to be rotated with finger until such time when an appropriate fulcrum position of the cable-hoisting seat 1 is so attained as to enable both brake cables 13 and 16 to be evenly acted on by the cable-hoisting seat 1. As a result, the working of the bicycle braking system is so improved that both brake shoes mounted repectively on the two brake seats 2 and 2' can be caused to arrest simultaneously the rim of the wheel of the bicycle.

It must be noted here that the body 63 of the bushing 6 has a length that is slightly greater than the thickness of the cable-hoisting seat 1 so as to enable the cable-hoisting seat 1 to be moved axially along the body 63 of the bushing 6 at the time when the cable-hoisting seat 1 is acting on the brake cables 13 and 16. The use of the nut 5 and the washer 51 between the threaded hole 421 of the upper support rod 42 and the cable-hoisting seat 1 is to facilitate the process of adjusting the position of the bushing 6 on the fastening shaft 7.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A cable-hoisting means of a bicycle brake comprising:
   a threaded shaft engageable with a threaded hole of an upper support rod fastened to a fork tube of a bicycle;
   a bushing having a head, a body and an eccentric through hole dimensioned to receive therein said threaded shaft;
   a cable-hoisting seat of a U-shaped construction and having an axial hole dimensioned to receive therein said body of said bushing;
   a washer having an axial hole engageable with said threaded shaft; and
   a nut engageable with said threaded shaft.

2. The cable-hoisting means of claim 1 wherein said bushing, said washer and said nut are mounted on said threaded shaft.

3. The cable-hoisting means of claim 1 wherein said cable-hoisting seat is mounted on said body of said bushing such that said cable-hoisting seat can be moved in the direction of a longitudinal axis of said body.

4. The cable-hoisting means of claim 3 wherein said body of said bushing has a length greater than a thickness of said cable-hoisting seat.

5. The cable-hoisting means of claim 1 wherein said head of said bushing is circular in shape.

6. The cable-hoisting means of claim 1 wherein said head of said bushing is hexagonal in shape.

7. The cable-hoisting means of claim 1 wherein said nut engages said threaded shaft to locate said bushing on said threaded shaft.

* * * * *